Patented Jan. 4, 1927.

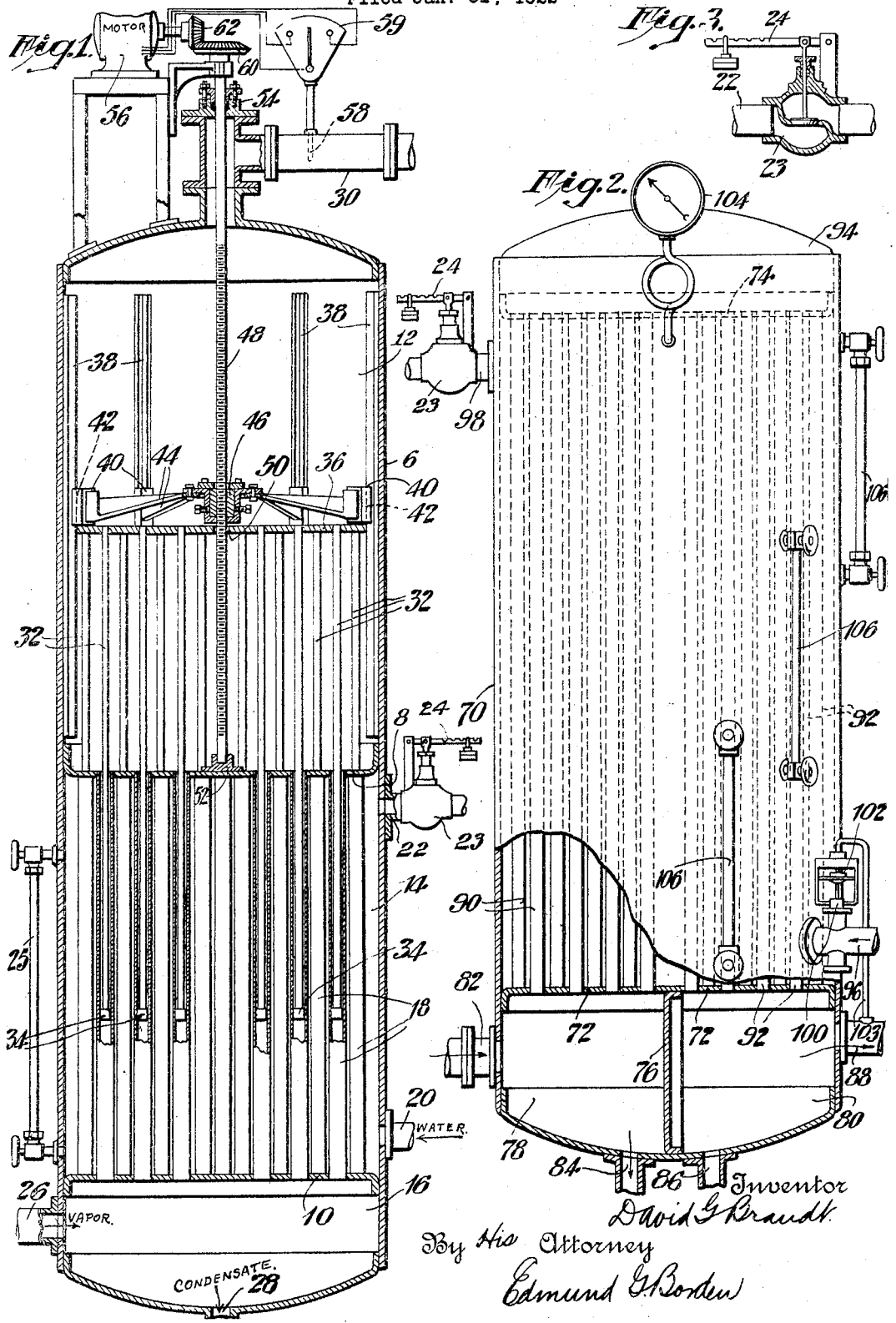

1,613,016

UNITED STATES PATENT OFFICE.

DAVID G. BRANDT, OF WESTFIELD, NEW JERSEY, ASSIGNOR TO DOHERTY RESEARCH COMPANY, OF NEW YORK, N. Y., A CORPORATION OF DELAWARE.

PROCESS AND APPARATUS FOR THE CONDENSATION OF VAPORS.

Application filed January 31, 1922. Serial No. 532,955.

This invention relates to an apparatus for the condensation of vapors to be used particularly in connection with oil distillation.

The knock-back condensers now commonly used on petroleum oil stills consist of some form of container having a fixed amount of condensing surface by which the oil vapors are condensed within the condensers through a heat interchange between the vapors and a cooling medium such as air or water. The condensing surface is generally calculated to be large enough to take care of ordinary normal flow of vapors, and if there is a change in the character of vapors coming off from the still it is the intention to use more or less water or air in condensing these vapors. The present condensers are very crude and inaccurate, in that they do not provide for changing character or volume of vapors, or for the constantly changing or varying temperatures of the cooling medium, such as air or water. The amount of vapor therefore which is condensed varies widely and is often the cause of a loss of a large amount of heat used in the distillation.

The primary object of the present invention is to provide an apparatus in which the temperature and amount of condensation may be accurately controlled.

The operation of a condenser for the condensation of vapors depends upon three principal factors:—

1st, the type of cooling medium; 2nd, the differential between the temperature of the cooling medium and the temperature of the vapors; and 3rd, the rate of transfer of heat from the cooling medium to the vapors. The rate of heat transfer varies quite widely with the character of the cooling medium employed. For example, if air is used as the cooling medium heat will be transferred at the rate of about 6 to 7 B. t. u.'s per square foot of the heat surface per degree of the temperature differential per hour. If superheated steam is used as the cooling medium, the rate of heat transfer will be about 4 to 5 B. t. u.'s per square foot of the heating surface per degree of temperature differential per hour. If water is used as the cooling medium, the rate of heat transfer will be about 100 B. t. u.'s per square foot of heating surface per degree of temperature differential per hour. On the other hand, if boiling water is used, the rate of heat transfer will vary from 500 to 1000 B. t. u.'s per square foot of the heating surface per degree of temperature differential, depending upon the rate of boiling. It is apparent, therefore, that with boiling water as a cooling medium, a condenser will have a very much larger capacity than if any of the other usual cooling mediums are used.

Accordingly, one object of the present invention is to provide a condenser in which boiling water may be used as the cooling medium.

When water is boiled, a large number of small bubbles are formed in the water and as a consequence, the level of the water in the boiler rises. Further, this water level continues to rise as the boiling becomes more and more violent. It is apparent therefore that if boiling water is used as the heat transferring medium, the highest rate of heat transfer will take place in the part of the condenser in which the vapors and boiling water are in direct contact. If the rate of boiling water varies, due to the amount and temperature of the vapors passing through the condenser, the capacity of the condenser will vary accordingly. In the practical operation of a boiling water condenser, the water level is very difficult to control.

With this in view, another object of the invention is to provide a boiling water condenser in which the amount of condensing surface may be varied to accurately suit the condition of operation.

Another object of the invention is to provide an apparatus which will automatically regulate the amount of the condensation depending upon the temperature of the vapors leaving it.

Another object of the invention is to produce a condenser in which the heat evolved in the condensation of oil vapors is utilized to generate steam to be used for power purposes.

Another object of the invention is to control the knock-back or condensate of the heavier fractions of the oil vapors previous to the condensation of the lighter desired fractions.

A further object of the invention is to produce an apparatus which may be used in series for the purpose of taking out various fractions of the oil vapor, the temperature at which the various cuts are made being automatically regulated, and thus attaining more uniformity of regulation of the condensation of the oil vapors than has heretofore been attained.

These and other objects which will be disclosed in the following description are obtained by the use of the apparatus illustrated in the drawings, in which.

Fig. 1 is a vertical section of a condenser embodying the preferred form of the invention, parts of which are shown in elevation;

Fig. 2 is a view in elevation of a modification of the apparatus, parts of which are shown in section; and Fig. 3 is sectional view of a regulating valve.

In the preferred form of the invention shown in Fig. 1, 6 is a casing in which are disposed two tube sheets 8 and 10 which divide the condenser into three sections, namely, section 12, the outgoing vapor-space above tube sheet 8; condensing section 14, the space between the tube sheets, and condensate collecting section 16, the lower portion of the condenser into which vapors are directly led from a still or other source. In the chamber 14 and disposed between the two tube sheets 8 and 10 is a series of tubes 18 which open into chambers 12 and 16 through the tube sheets. At the lower portion of the condensing chamber 14 is an inlet pipe 20 for conducting water or other condensing fluid to the chamber around the pipes 18 and at the upper portion of this chamber is a pipe 22 for withdrawing steam or other vapor produced by the vaporization of the condensing fluid therein. A regulating valve 23 in pipe 22, shown in Fig. 3, serves to maintain a constant pressure in the chamber around pipes 18 during operation of the apparatus. The water level in this chamber is preferably maintained at a level at approximately two-thirds of the height of the chamber which may be indicated by a gauge glass 25 as shown in the drawing. Water is fed to the apparatus through the pipe 20 at such a rate as to maintain approximately a constant level in the apparatus.

Attached to one side of the condensate collecting chamber 16 is a conduit 26 for conducting vapors to be condensed to the apparatus, and leading from the lower end of the chamber is a pipe 28 for the purpose of conducting away condensate formed therein. The vapors remaining uncondensed in the apparatus are withdrawn through a vapor pipe 30 leading from the chamber 12 at the top of the condenser and pass to other condensing apparatus to remove the remaining lighter oil fractions in the vapors.

As thus far described the elements enumerated constitute substantially the ordinary form of commercial condenser. The variation from this form of condenser consists in the use of a series of tubes 32 which telescope with the tubes 18 and serve to withdraw vapors from the latter tubes at different points along their length and thus effect in a manner to be explained the variation of the amount of condensing surface for the vapors to be condensed. In order to form a gas tight sliding connection between the tubes 18 and 32 ferrules 34 are attached to the lower ends of the tubes 32 which prevent vapors from passing upwardly between the tubes. The tubes 32 at their upper ends are secured in a tube sheet 36 whose position may be varied along the length of the condenser and thus determine the position of the movable tubes 32 within the stationary tubes 18.

In order to maintain the tubes 32 in axial alignment with respect to tubes 18 as the former tubs are raised and lowered by the movable tube sheet 36, a series of guide-posts 38 are attached to the inner walls of the casing 6. Sliding upon each of the guide-posts is a shoe or block 40 having a groove 42 which fits a raised portion of the guide-posts. Each block 40 is attached to a bracket 44 which bracket is in turn rigidly attached at its inner end to a nut or block 46 disposed centrally of the tube sheet 36 and arranged to travel upward and downward upon a screw 48 to move the tubes 32 within the tubes 18. The screw 48 passes through a central opening 50 in the plate or tube-sheet 36 and extends downward into a bearing 52 which may be made integral with, or attached to, the tube-sheet 8. The screw 48 at its upper end passes through a bearing and stuffing box 54 which is packed in the ordinary manner to prevent vapors from escaping at this point.

For the purpose of operating the screw 36 and the parts coacting therewith a motor 56 may be connected thereto through gears 60 and 62, the motor employed being preferably reversible, and automatically operable in conformity with the temperature of the vapor leaving the condensing apparatus. To accomplish this a resistance thermometer 58 is disposed in the path of the vapors in the outlet pipe 30 which controls a thermostat regulator 59 that is electrically connected in circuit with the motor. Thus indirectly the thermostat serves to control the raising and lowering of the pipes 32 and the area of heat transferring surface of pipes 18 exposed to the vapors, in accordance with the temperature of the outgoing vapors in the said outlet pipe. In the operation of the apparatus if the thermostat is set to operate between two certain temperature limits, and the temperature of the vapors attains the lower limit, the thermostat then operates the motor by connecting it with the electrical circuit which causes the motor to rotate in such a direction as to lower the tube-sheet and pipes attached thereto, and consequently results in the exposure of a smaller length of pipe and less cooling surface of pipes 18 to the vapors undergoing condensation. As soon as the temperature of the vapors increases due to the decrease in cooling surface, the thermostat breaks contact with the electrical circuit and the motor is stopped. The motor thereupon remains stationary leaving the pipes 32 in their new position until another change in temperature of the vapors takes place. When the temperature of the vapors becomes too high, or above the maximum desired temperature, the thermostat 58 operates the switch to the main line and causes the motor to operate in such a direction as to raise the tube sheet 36 and parts attached thereto, thus giving an increased surface exposure of the pipes 18 to the vapors passing therethrough, resulting in a greater cooling of the vapors. The cooler vapors upon coming into contact with the thermostat cause the latter to disconnect the motor from the electrical circuit and the raising of the tubes 32 to be discontinued.

The rate at which the tubes are raised or lowered may be regulated satisfactorily by the use of gears whose ratio is such as to attain the desired speed with the particular motor speed used. A comparatively slow rate of motion of the screw 48 is desired in order that the upward or downward motion of the tubes will not be too great and cause too frequent a fluctuation of the temperature of the vapors leaving the apparatus. In some cases it may be desirable to employ an automatic tripping means for the motor by which the motor after being caused to operate for a definite time interval by the thermostat is disconnected from the electrical circuit for another definite period of time. If after this time a state of equilibrium has been attained the switch of the thermostat will have passed out of contact with the terminals of the main line. If, however, the temperature of the vapors is still outside of the limits desired, the motor will again operate until a temperature within the limits desired is reached.

The operation of the preferred form of the condenser may now be described.

Vapors from an oil still or other source enter the lower chamber 16 of the condenser through the pipe 26, and pass upwardly through pipes 18, in which a part of the vapors become condensed and drop back into the chamber 16. The vapors so condensed are withdrawn through a pipe 28 to be passed back into the still or utilized in any manner desired. The vapors in passing through the pipes 18 are cooled by the water surrounding the pipes and then pass out of contact with the cooling surface by passing through openings in ferrules 34 into pipes 32 which are substantially heat insulated from pipes 18 by a column of fixed still gases which accumulate between the pipes under normal operating conditions. The vapors pass upward through tubes 32 and out into chamber 12, from whence they pass into pipe 30 and into contact with the thermostat 58 which is adjusted to operate when certain limits of temperature of the outgoing still vapors are reached. The heat of the vapors passing through the apparatus is transmitted through the tubes 18 to the water in section 14 in contact with the exterior of the tubes. The condenser water is thereby vaporized, and the steam passing out through the pipe 22 and pressure regulator 23 may be used for any desired purpose, such, for instance, as running auxiliary apparatus, such as steam pumps and the like; or it may be utilized by passing it with boiler steam into the steam lines. The pressure at which the steam is generated in the chamber 14 around the pipes 18 of the condenser may be regulated by the pressure regulating valve 23 in the pipe 22. The condenser whose operation has now been described may be heat insulated in order to avoid loss of heat by conduction to the surrounding atmosphere.

The adjustment of the telescopic tubes and the adjustment of the stream pressure valve 23 provide two different means by which the vapor condensation may be controlled. The higher the steam pressure in the condensing section 14 the higher will be the temperature of the water and steam therein. The steam pressure therefore directly controls the temperature differential between the boiling water and the vapors. It will be understood therefore that for fractional distillation the steam pressure regulation affords a convenient means for adjusting the condenser to provide for the variation of the boiling points of the different vapor fractions being taken off in succession. The pressure regulator 23, Fig. 3, has a weight adjusting arm 24 by which the regulator may be set to maintain any desired pressure in the section 14.

Under certain conditions of operation it is desirable to employ a modified form of condenser such as is illustrated in Fig. 2 of the drawings. In places where the water supply is bad, and the water contains inorganic matter such as akaline carbonates which have a tendency to produce foaming when the water is boiled, the form of condenser just described is admirably adapted for the reason that irrespective of any foaming of the water around the condenser pipes, the heat transferring surface or zone in the apparatus may be accurately limited through varying the position of the movable vapor conducting tubes. In places however where the water available for condensing purposes is reasonably pure, so that little foaming would take place on boiling, a modified form of the condenser may be used in which, aside from a thermostatically operated valve to control the influx of water or condensing fluid to the apparatus, there are no electrically or mechanically operated parts. The modified form of the condenser is simple in operation and construction, and is preferably used where electric power is unavailable or where the maintenance is poor or unreliable. The condenser is particularly well adapted for the handling of vapors where the fluctuation in volume of the vapors is comparatively small, and where the boiling point of the vapors is substantially uniform.

The modified form of the condenser shown in Fig. 2 has a casing 70 near the ends of which two tube sheets 72 and 74 are located which divide the condenser into three sections as in the case of the condenser shown in Fig. 1. The lower section of the apparatus is again sub-divided into two sections 78 and 80 by a plate 76 which serves to separate the incoming and the outgoing vapors. A vapor pipe 82 is employed to conduct vapors to the section 78 and an outlet pipe 84 at the bottom of this chamber serves to withdraw condensate therefrom. Connected to the chamber 80 at the lower part of the apparatus is a pipe 86 for the purpose of withdrawing condensate formed in this chamber, and connected to the same section also is a vapor pipe 88 through which uncondensed vapors are withdrawn from the apparatus. The tube sheets above referred to are connected by a series of pipes 90 and 92 passing longitudinally through the apparatus. The pipes 90 connect chamber 78 with a chamber 94 at the top of the apparatus and pipes 92 serve to connect the chamber 94 with the chamber 80. At the lower end of the middle section of the apparatus is an inlet pipe 96 for the admission of condensing water into this section around the condensing tubes 90 and 92. An outlet pipe 98 is connected at the top of the same section for withdrawing the steam which is generated in the apparatus.

In order to maintain constant operating conditions it is necessary that water should be supplied to the condenser at such a rate that the heat of the vapors undergoing condensation will just be sufficient to vaporize the water at the rate supplied.

In order to accomplish such regulation a regulating valve 100 is employed in the inlet pipe 96, the regulating valve being controlled by a thermostat 102 having a thermometer 103 in the vapor outlet pipe 88. As the temperature of the outgoing vapors in pipe 88 varies a corresponding change in the set of the valve 100 in pipe 96 is made, by which the conditions of operation are maintained substantially constant.

Near the top of the condenser and connected to the steam space between the tube sheets is a pressure gauge 104 for indicating the amount of steam pressure in the apparatus. The pressure of the steam which is generated may be controlled by a pressure regulating valve similar to valve 23 of Fig. 3 on the steam outlet pipe 98. A number of gauge glasses 106 as shown in the drawing may be employed to indicate the water level in the middle section of the apparatus, the water level varying to a large extent, depending upon the temperature of the incoming water and the temperature of the vapors supplied to the apparatus. By regulating the water level around the pipes 90 and 92 in the condensing section the effective condensing area of the apparatus is regulated.

The operation of the apparatus shown in Fig. 2 is as follows: Vapor from any source is admitted through pipe 82 and is passed to the lower chamber 78 and from thence upwardly through pipes 90 to chamber 94 at the top of the apparatus. During the passage of the vapors through pipes 90 a cooling of the vapors is effected by means of the water in contact with the exterior surfaces of the pipes. The heavier fractions of the vapors are condensed in the pipes and run down the interior surfaces thereof, returning to chamber 78 from which they are withdrawn by means of pipe 84. The uncondensed portion of the vapors passes from the upper chamber 94 down through pipes 92 where other fractions of the vapors condense through contact with the cooled pipes and pass to the chamber 80, from which they are withdrawn through pipe 86. The uncondensed vapors pass out of the apparatus through pipe 88 after which the vapors may be condensed by suitable means. Water for condensing the vapors in the apparatus is led into the chamber surrounding pipes 90 and 92 through the pipe 96 in which valve 100 is employed for regulating the admission of the water. This valve is directly connected to the thermostat at 102 which is controlled by the temperature of the vapors leaving the apparatus through pipe 88. The admission of water may be regulated to suit the conditions of operation by setting the valve so as to give the desired water level in the apparatus with a definite temperature of the outgoing vapors. The pressure of steam generated in the apparatus may also be regulated by the set of the regulating valve in the pipe 98 for controlling the outlet of the steam generated in the apparatus.

Either form of the invention may be used in series so as to generate steam in two or more units and to obtain different fractions of condensate in each unit before the final condensation step to obtain gasoline or other light fractions. It may be desirable under certain conditions to employ the preferred and modified form of the apparatus in the same series, as for instance, when the volume of vapors being delivered is too large for one condenser to handle, and the vapors leaving the first condenser for which the preferred form is employed are of substantially uniform composition so as to be easily handled by the modified form of condenser.

Having thus described the invention, what is claimed as new is:

1. In an apparatus of the kind described, a casing a series of tubes for condensing vapors therein, and means for varying the effective condensing surface of the said tubes in accordance with the temperature of the outlet vapors.

2. In an apparatus of the kind described, a casing, a series of tubes for condensing vapors therein, and means for automatically varying the extent of contact of the vapors therewith in accordance with the temperature of the outlet vapors.

3. In an apparatus of the kind described, a casing, tube sheets within the casing, a series of tubes connecting and opening through the said tube sheets, a series of tubes within the first named tubes slidably arranged therein and mounted so as to permit varying the amount of condensing surface of the apparatus and a vapor inlet and vapor outlet for the apparatus.

4. In an apparatus of the kind described, a casing, tube sheets within the casing, a series of tubes connecting the said tube sheets, a series of tubes within the first named tubes slidably arranged therein and mounted so as to permit varying the amount of condensing surface of the apparatus, a vapor inlet and a vapor outlet for the apparatus, and means for automatically varying the position of the slidable tubes in conformity with variations in temperature of the vapors passing through the vapor outlet of the apparatus.

5. In an apparatus of the kind described, a casing, tube sheets within the casing, separating the same transversely into three chambers, a series of tubes connected to the said tube sheets and forming a passage-way for vapors between the chambers at the two extremities of the apparatus, and forming also a space external to the tubes and between the said tube sheets into which a condensing medium may be passed, conduits leading to and from the said space for the condensing medium, conduits for the inlet and outlet of the vapors to and from the apparatus, a conduit for conducting away condensate from the apparatus, and means for automatically varying the amount of heat transferring surface to maintain the temperature of the outgoing vapors constant.

6. In an apparatus of the kind described, a casing, tube sheets within the casing, separating the casing transversely into exterior chambers and a middle chamber, a series of tubes longitudinally arranged within the casing and connecting the said tube-sheets and opening therethrough to form a passage-way between the two exterior chambers, a series of tubes within the first named tubes and telescoping therewith so as to permit varying the amount of heat transferring surface to contact with the vapors.

7. In an apparatus of the kind described, a casing, tube sheets within the casing separating the said casing into two exterior chambers and an interior chamber, a series of tubes connecting the said tube-sheets and opening therethrough so as to connect the two exterior chambers, the interior vapor contact surface of the said tubes constituting a condensing surface, a series of tubes within the first named tubes slidably arranged therein, and mounted so as to permit varying the condensing surface of the first named tubes, a motor operatively connected to the last named tubes for varying the position of the said tubes, a vapor inlet and a vapor outlet, and a thermostat in said vapor outlet to control the operation of the said motor.

8. In an apparatus of the kind described, a casing, tube-sheets within the casing dividing the condenser into a vapor inlet section, a condensing section, and a vapor outlet section, a series of tubes within the said condensing section connecting the said tube-sheets and forming a chamber external to the tubes and between the tube sheets, and forming also a passageway between the vapor inlet section and the vapor outlet section, a conduit connected to the said chamber for admission of cooling fluid, a second conduit connected to the said chamber for the exit of vaporized cooling medium, a series of tubes telescopically arranged with respect to the first named tubes and mounted so as to form a vapor seal at their lower end, and at their upper end attached to a tube-sheet, mounted transversely with respect to the axis of the said casing and movable along the said axis, means for maintaining the tubes in axial alignment, and means for automatically varying the position of the tubes in accordance with the temperature of outgoing vapors, means for conducting vapors to the vapor inlet section, means for withdrawing condensate from the said section, and means for the withdrawal of vapors from the said vapor-outlet section.

9. In an apparatus of the kind described a casing, tube-sheets mounted transversely of the casing, a series of tubes connected to the said tube-sheets, the space between the tube-sheets and external to the said tubes constituting a space for a cooling medium for condensing vapors, a conduit connected to the said space for a cooling medium for conducting a cooling medium thereto, a conduit connected to the said space for a cooling medium for withdrawing the cooling medium therefrom, a pressure-regulating device in the last named conduit for limiting the pressure in the space for the said cooling medium, conduits for leading vapors to and from the said tubes and means for varying the effective condensing surface of said tubes in accordance with the temperature of vapors passing away from said tubes.

10. In an apparatus of the kind described a casing, tube-sheets mounted transversely of the casing, a series of tubes connected to the said tube-sheets, the space between the tube-sheets and external to the said tubes constituting a space for a cooling medium for condensing vapors, a conduit connected to the said space for a cooling medium for conducting a cooling medium thereto, a conduit connected to the said space for a cooling medium for withdrawing the cooling medium therefrom, a pressure-regulating device in the last named conduit for regulating and maintaining a predetermined constant pressure in the space for the said cooling medium, conduits for leading vapors to and from the said tubes, and means for automatically varying the amount of heat-transferring surface to maintain the temperature of the outgoing vapors constant.

11. A condensing apparatus comprising, in combination, means for cooling vapors having a variable effective surface, means whereby vapors are introduced into the apparatus, means whereby condensate is removed from the apparatus, means whereby uncondensed vapors are conducted away from the apparatus, means whereby a cooling medium is passed through the apparatus, and means for varying the effective area of said cooling surface in accordance with the temperature of uncondensed vapors which have passed over said surface.

12. The method of condensing vapors comprising cooling the vapors by heat interchange with a cooling medium, removing condensate from the uncondensed vapors, and regulating the rate of cooling said vapors by the temperature of uncondensed vapors which have been subjected to said cooling step.

In testimony whereof I affix my signature.

DAVID G. BRANDT.